United States Patent [19]
Bilek et al.

[11] Patent Number: 5,559,061
[45] Date of Patent: Sep. 24, 1996

[54] GEM COMPRISED OF A GLASS BASED ON SILICON OXIDE AND CALCIUM OXIDE

[75] Inventors: Norbert Bilek, Wattens; Wolfgang Porcham, Mils; Michael Schlamadinger, Volders; Gerold Sprachmann, Kolsass, all of Austria

[73] Assignee: D. Swarovski & Co., Wattens, Austria

[21] Appl. No.: 557,518

[22] Filed: Nov. 14, 1995

Related U.S. Application Data

[63] Continuation of Ser. No. 277,227, Jul. 19, 1994, abandoned.

[30] Foreign Application Priority Data

Jul. 21, 1993 [DE] Germany .......................... 43 24 492.0

[51] Int. Cl.$^6$ ............................ C03C 3/083; C03C 3/087
[52] U.S. Cl. .................. 501/69; 501/70; 501/71; 501/86; 63/32
[58] Field of Search .................. 501/70, 71, 69, 501/86; 63/32

[56] References Cited

U.S. PATENT DOCUMENTS

| | | |
|---|---|---|
| 2,859,138 | 11/1958 | Blanchard et al. . |
| 3,843,343 | 10/1974 | Okada et al. . |
| 4,749,665 | 6/1988 | Yano et al. ................. 501/70 |
| 5,219,800 | 6/1993 | Kelso et al. . |
| 5,250,488 | 10/1993 | Thelohan et al. .......... 501/70 |
| 5,338,771 | 8/1994 | Neumann et al. .......... 501/70 |
| 5,480,844 | 1/1996 | Matsui et al. ............. 501/86 |

FOREIGN PATENT DOCUMENTS

| | | | |
|---|---|---|---|
| 0037919 | 4/1974 | Japan ...................... 501/70 |
| 0660950 | 5/1979 | U.S.S.R. ................. 501/70 |

OTHER PUBLICATIONS

Chemical Abstracts, vol. 108, No. 18, abstract No. 155310, p. 313.
Chemical Abstracts, vol. 103, No. 2, abstract No. 10363.
Chemical Abstracts, vol. 84, No. 16, abstract No. 110356, p. 315.

*Primary Examiner*—Karl Group
*Attorney, Agent, or Firm*—Fay, Sharpe, Beall, Fagan, Minnich & McKee

[57] ABSTRACT

A glass composition substantially comprising silicon oxide, calcium oxide and aluminum oxide, and its use for producing gems.

12 Claims, No Drawings

GEM COMPRISED OF A GLASS BASED ON SILICON OXIDE AND CALCIUM OXIDE

This is a continuation of U.S. application Ser. No. 08/277,227 filed on Jul. 19, 1994, now abandoned.

The present invention relates to glass based on silicon oxide and calcium oxide.

For producing gems one preferably uses glass qualities which have a high refractive index nD>1.55 and a hardness as high as possible and are able to absorb enough dopants that even small stones with an envelope curve of under 1 mm can be intensively colored.

To produce gems one often uses lead glass qualities with a PbO content of up to over 30% by weight. These glass qualities usually also contain small amounts of $As_2O_3$ and/or $Sb_2O_3$. Advantages of these glass compositions are the relatively high refractive index, which provides fire or brilliance, and that colored stones with this basic composition are interesting as gems due to their lively sparkle.

However, disadvantages of these glass compositions are their toxic components and the low Mohs' hardness of 5.5, which do not permit use as a ring stone for example.

A clear improvement in hardness can be obtained for example by glass qualities of the system silicon oxide, lithium oxide, aluminum oxide and beryllium oxide. However, with beryllium oxide and lithium oxide these glass qualities likewise contain very toxic substances.

The invention is based on the problem of providing a novel glass composition that can be built up completely from nontoxic components and has a high refractive index and high hardness.

The object of the invention is a glass composition characterized by the following composition in % by weight based on oxide:

| | |
|---|---|
| $SiO_2$ | 42–64 |
| CaO | 21–57 |
| $Al_2O_3$ | 1–15. |

The object of the invention is also the use of a glass composition with the following components in % by weight based on oxide:

| | |
|---|---|
| $SiO_2$ | 42–64 |
| CaO | 21–57 |
| $Al_2O_3$ | 1–15 | to produce gems with a refractive index of over 1.59 and a Mohs' hardness of over 6.

The system silicon oxide, calcium oxide, aluminum oxide contains solely safe components and is therefore suitable for all applications in which people come in direct contact with the glass, for example for gems.

The inventive glass compositions typically show a refractive index of over 1.59 and a Mohs' hardness of over 6.

The glass compositions are also characterized by high absorbing power for dopants for giving the glass any coloring. Even small gems with an envelope curve of under 1 mm can be intensively colored.

The inventive glass compositions also show high chemical resistance.

The glass composition in % by weight is preferably as follows:

| | |
|---|---|
| $SiO_2$ | 46–60 |
| CaO | 30–50 |
| $Al_2O_3$ | 2–12. |

Particularly preferred is a glass composition in % by weight:

| | |
|---|---|
| $SiO_2$ | 50–60 |
| CaO | 35–45 |
| $Al_2O_3$ | 5–10. |

The inventive glass composition can also contain one or more of the following components instead of CaO:

| | | |
|---|---|---|
| BeO | 0–4% | by weight |
| MgO | 0–20% | by weight |
| SrO | 0–8% | by weight |
| BaO | 0–5% | by weight |
| $Li_2O$ | 0–8% | by weight |
| $Na_2O$ | 0–8% | by weight |
| $K_2O$ | 0–8% | by weight |
| $Rb_2O$ | 0–8% | by weight |
| $Cs_2O$ | 0–8% | by weight. |

BeO, BaO and $Li_2O$ can be present but are not preferred since they are hazardous to health. $Na_2O$ and $K_2O$ are not preferred since they reduce hardness. Also the inventive glass compositions can contain the following components instead of $SiO_2$:

| | |
|---|---|
| $B_2O_3$ | 0–8% by weight |
| $ZrO_2$ | 0–4% by weight |
| $TiO_2$ | 0–6% by weight. |

The following chemical elements can be used in the form of metals, oxides or salts to color the glass composition, singly or in combination:

Chromium, manganese, iron, cobalt, copper, silver, tin, gold, cerium, praseodymium, neodymium, erbium.

Selenium and/or cadmium might also be used. However they are not preferred since they are toxic.

Due to the absorbing power of the inventive glass compositions for dopants they are suitable particularly for producing colored glass, and due to their safeness particularly for gems.

The raw materials for producing the glass composition can also contain other customary additives, for example sodium chloride and/or sodium sulfate in amounts up to 1% by weight in order to remove bubbles from the glass while still molten.

The invention will be explained in more detail in the following with reference to examples.

EXAMPLE 1

A colorless glass was melted from the following raw materials:

| | |
|---|---|
| Quartz powder | 560.8 g |
| Limestone | 625.5 g |
| Aluminum oxide | 92.0 g |
| Common salt | 10.0 g |

The powdery raw materials were intimately mixed and melted down at a temperature of 1550° C. for 2 hours in an inductively heated platinum crucible and then cooled.

EXAMPLE 2

A blue glass was melted from the following raw materials:

| | |
|---|---|
| Quartz powder | 635.7 g |
| Limestone | 822.2 g |
| Aluminum oxide | 57.5 g |
| Cobalt oxide | 0.6 g |

The raw materials were intimately mixed and fed into a platinum crucible preheated to 1600° C. The melting process took place in a box furnace at 1600° C. for 3 hours. Afterwards the molten glass was cooled to room temperature.

We claim:

1. A gem comprised of a glass composition having the following composition in % by weight based on oxide:

| | |
|---|---|
| $SiO_2$ | 42–64 |
| CaO | 21–57 |
| $Al_2O_3$ | 1–15. |

2. The gem of claim 1, characterized by a glass composition having the following composition in % by weight based on oxide:

| | |
|---|---|
| $SiO_2$ | 46–60 |
| CaO | 30–50 |
| $Al_2O_3$ | 2–12. |

3. The gem of claim 1, characterized by a glass composition having the following composition in % by weight based on oxide:

| | |
|---|---|
| $SiO_2$ | 50–60 |
| CaO | 35–45 |
| $Al_2O_3$ | 5–10. |

4. A gem comprised of a glass composition having the following composition in % by weight based on oxide:

| | |
|---|---|
| $SiO_2$ | 42–64 |
| CaO | 21–57 |
| $Al_2O_3$ | 1–15, | wherein at least one or more of the following components at least partially replaces the CaO of said composition:

| | | |
|---|---|---|
| BeO | 0–4% | by weight |
| MgO | 0–20% | by weight |
| SrO | 0–8% | by weight |
| BaO | 0–5% | by weight |
| $Li_2O$ | 0–8% | by weight |
| $Na_2O$ | 0–8% | by weight |
| $K_2O$ | 0–8% | by weight |
| $Rb_2O$ | 0–8% | by weight |
| $Cs_2O$ | 0–8% | by weight. |

5. A gem comprised of a glass composition having the following composition in % by weight based on oxide:

| | |
|---|---|
| $SiO_2$ | 42–64 |
| CaO | 21–57 |
| $Al_2O_3$ | 1–15, | wherein at least one or more of the following components at least partially replaces the $SiO_2$ of said composition:

| | | |
|---|---|---|
| $B_2O_3$ | 0–8% | by weight |
| $ZrO_2$ | 0–4% | by weight |
| $TiO_2$ | 0–6% | by weight. |

6. The gem of claim 1, characterized in that the glass composition further contains one or more chemical elements in the form of metals, oxides or salts selected from the group consisting of chromium, manganese, iron, cobalt, copper, silver, tin, gold, cerium, praseodymium, neodymium, and erbium.

7. The gem of claim 1, characterized in that it has a refractive index of over 1.59.

8. The glass composition claim 1, characterized in that it has a Mohs' hardness of over 6.

9. The gem of claim 2, characterized by the following composition in % by weight based on oxide:

| | |
|---|---|
| $SiO_2$ | 50–60 |
| CaO | 35–45 |
| $Al_2O_3$ | 5–10. |

10. The gem of claim 3, characterized in that the glass composition contains one or more chemical elements in the form of metals, oxides or salts selected from the group consisting of chromium, manganese, iron, cobalt, copper, silver, tin, gold, cerium, praseodymium, neodymium, and erbium.

11. The gem of claim 4, characterized in that the glass composition contains one or more chemical elements in the form of metals, oxides or salts selected from the group consisting of chromium, manganese, iron, cobalt, copper, silver, tin, gold, cerium, praseodymium, neodymium, and erbium.

12. The gem of claim 5, characterized in that the glass composition contains one or more chemical elements in the form of metals, oxides or salts selected from the group consisting of chromium, manganese, iron, cobalt, copper, silver, tin, gold, cerium, praseodymium, neodymium, and erbium.

* * * * *